United States Patent [19] [11] 3,869,099

Inaga [45] Mar. 4, 1975

[54] TAPE RECORDING AND/OR REPRODUCING APPARATUS AND TAPE CASSETTE FOR USE THEREWITH

[75] Inventor: Katsu Inaga, Tokyo, Japan

[73] Assignee: Sony Corporation, Tokyo, Japan

[22] Filed: Nov. 12, 1973

[21] Appl. No.: 415,220

[30] Foreign Application Priority Data

Nov. 13, 1972 Japan .............................. 47-130617

[52] U.S. Cl. .................................. 242/199, 360/93

[51] Int. Cl.... G03b 1/04, G11b 15/32, G11b 23/04

[58] Field of Search ......... 242/197, 200; 360/93, 96

[56] References Cited

UNITED STATES PATENTS

| | | | |
|---|---|---|---|
| 2,676,766 | 4/1954 | Ross et al. | 242/76 |
| 2,941,741 | 6/1960 | Bilsback | 242/199 |
| 3,140,832 | 7/1964 | Cech | 242/199 |

*Primary Examiner*—Leonard D. Christian
*Attorney, Agent, or Firm*—Lewis H. Eslinger; Alvin Sinderbrand

[57] ABSTRACT

A tape cassette includes a housing containing at least one rotatable reel having tape wound thereon and being engageable through an aperture in the housing, and a floating member axially movable with the reel between a normal retracted position in respect to the outer surface of the housing and a projecting position extending from the housing, and the tape recording and/or reproducing apparatus for use with the foregoing cassette includes a holder for receiving the cassette and being movable with the latter relative to a reel drive member for each reel to an operative position at which the reel drive member extends through the housing aperture and engages the respective reel for controlling the rotation thereof and for axially displacing the reel so as to move the floating member to its projecting position, and a reel locating member carried by the holder so as to be spaced from the cassette housing received in the holder, such reel locating member being engageable with the floating member in the projecting position of the latter for cooperating with the reel drive member in firmly establishing a predetermined axial location of the respective reel.

27 Claims, 12 Drawing Figures

FIG. 2
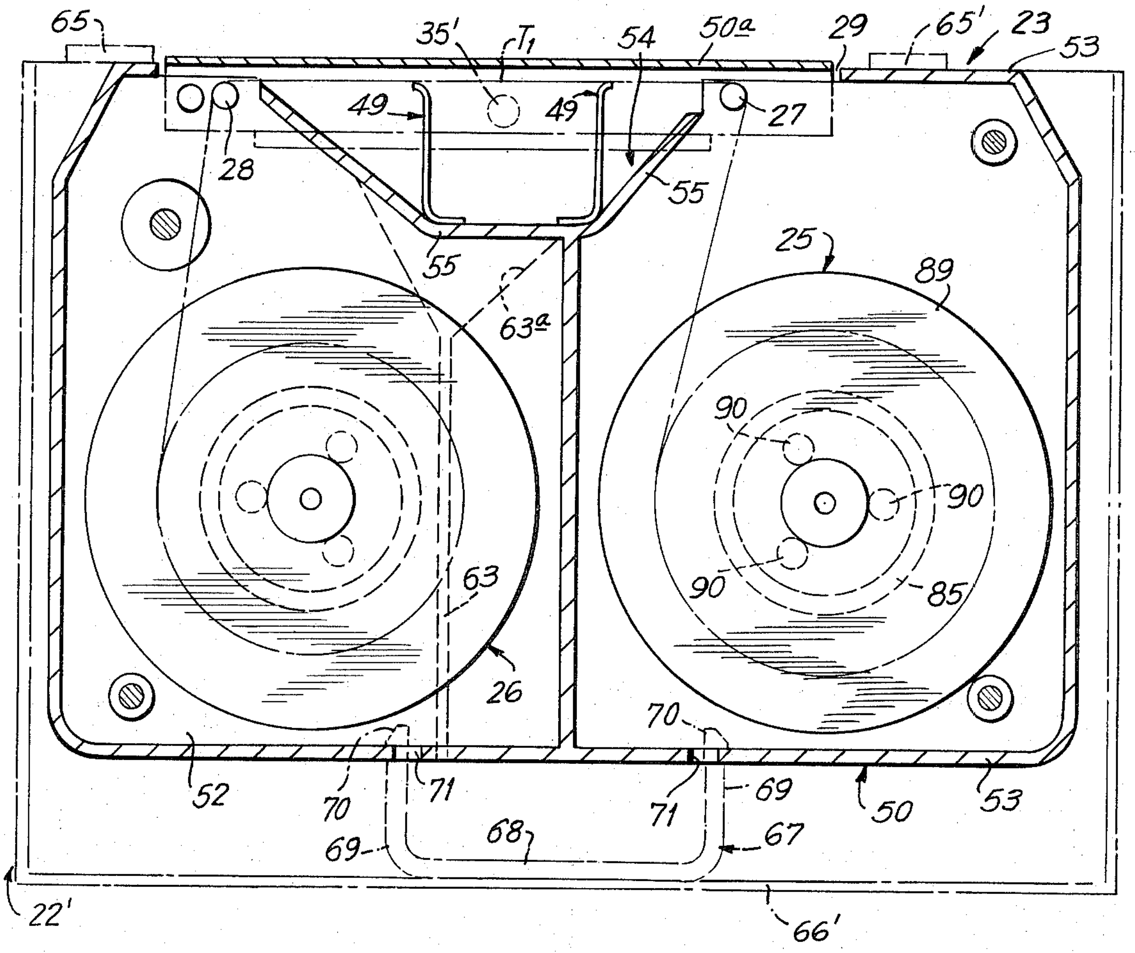
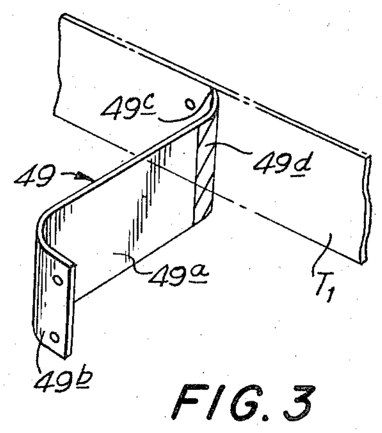
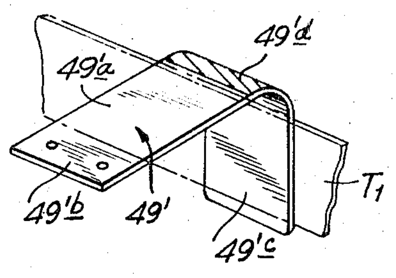
FIG. 3 FIG. 4

TAPE RECORDING AND/OR REPRODUCING APPARATUS AND TAPE CASSETTE FOR USE THEREWITH

BACKGROUND OF THE INVENTION

1. Field of the Invention

This invention relates generally to tape recording and/or reproducing apparatus, for example, video tape recorders (VTR), and to tape cassettes for use therewith.

2. Description of the Prior Art

Tape recording and/or reproducing apparatus, such as video tape recorders, have been provided for use with tape cassettes in which the tape is wound on one or more reels contained in a housing. When signals are to be recorded on, or reproduced from the tape by means of the apparatus, the cassette is introduced into a holder and lowered with the letter to an operative position in which a rotatable reel drive member projecting upwardly from the chassis for each reel extends through a respective aperture in the cassette housing and engages the associated reel for controlling the rotation of the latter as the tape is transported or driven during the recording or reproducing of signals thereon by means of one or more magnetic heads or transducers. In the case of video tape recorders, the magnetic heads or transducers are usually rotatably associated with the guide drum which is mounted on the chassis so as to be spaced from the cassette in the operative position of the cassette holder, and a tape loading device is provided for engaging the tape within the cassette housing, and then withdrawing the tape from the latter and wrapping the withdrawn tape about the guide drum for scanning by the rotary magnetic heads in oblique or skewed tracks on the tape, for example, as disclosed in detail in U.S. Pat. No. 3,740,495, issued June 19, 1973, and having a common assignee herewith.

In order to ensure the proper engagement of the tape loading device with the tape within the cassette housing and/or the accurate positioning of the tape in respect to the magnetic heads or transducers for the proper recording or reproducing of signals by the latter, it is necessary that each reel in the cassette be at a precisely predetermined aixal location in respect to the cahssis when the cassette holder is in its operative position. In existing tape cassettes, each reel is loosely disposed within the cassette housing so as to be axially displaceable as well as rotatable therein, and each reel has an axial socket which, in the operative position of the cassette, opens downwardly to receive the respective reel drive member. The upper end of the reel drive member may have a coupling pin extending therefrom and spaced from the axis of rotation for engagement in a similarly positioned coupling bore or recess in the top of the socket when the reel rests on an upwardly facing annular support shoulder provided on the reel drive member.

So long as the recording and/or reproducing apparatus is fixedly positioned and horizontally oriented during its operation, that is, each reel drive member has its axis extending vertically, the engagement of each reel with the upwardly facing annular support shoulder on the respective reel drive member will adequately establish the axial location of the reel relative to the chassis for the purposes indicated above. However, if thn recording and/or reproducing apparatus or VTR is intended to be portable during use, in which case the axis of each reel drive member may extend horizontally and the apparatuj may be subjected to shocks or impacts, it will be apparent that each reel may move axially away from the annular support shoulder of the respective reel drive member even though the cassette housing is fixedly positioned in the holder at the operative position relative to the chassis. Such movement of a reel relative to its reel drive member may cause disengagement of the coupling pin from the coupling bore or recess in addition to affecting the proper engagement of the tape loading device with the tape in the cassette and/or the proper scanning of the tape by the magnetic heads or transducers, as previously mentioned.

In U.S. Pat. No. 3,583,656, issued June 8, 1971, it is proposed to provide a carriage or holder for a tape cassette having a pair of side channel members defining tracks or guides along which the cassette housing can be slidably inserted into the carriage. Such carriage further has an upper cross-member extending between the side channel members and carrying balls or detents which are resiliently urged downwardly and move across the top surface of the cassette housing as the latter is inserted into the carriage until the balls or detents engage in the upper ends of axial bores provided in the reel hubs for positioning the reels in respect to the carriage. Thereafter, when the carriage or cassette holder is moved to its operative position, the lower end portions of the bores in the reel hubs receive respective reel drive shafts of the tape transport on recording and-/or apparatus. Slthough Although resiliently urged balls or detents of the above arrangement act, in the operative position of the carriage or cassette holder, to resist axial displacement of the reels relative to the respective reel drive shafts, such arrangement is disacvantageous in that the balls or detents engage, and move across, the top surface of the cassette housing during the insertion and removal of the cassette and, upon repeated insertion and removal of cassette, will mar and eventually obliterate the printed indicia or designs that are usually applied either to the top surface of the cassette housing or to a label affixed thereto. Further, if the resilient force urging the balls or detents against the upper ends of the reel hub bores is made sufficiently large to prevent axial displacement of the reels in respect to the reel drive shafts when subjected to shocks or impacts, for example, as when the recording and/or reproducing apparatus is made to be portable in use, such large force will resist removal of the balls or detents from the reel hub bores and thereby impose an undesirably large resistance to removal of the cassette from the carriage.

SUMMARY OF THE INVENTION

Accordingly, it is an object of this invention to provide an improved tape cassette and a tape recording and/or reproducing apparatus for use therewith in which the axial location of each reel of the cassette is firmly established when the cassette is in the operative position thereof and marring or scratching of the top surface of the cassette housing is avoided during the insertion and removal of the cassette.

Another object is to provide a tape cassette and a tape recording and/or reproducing apparatus for use therewith, as aforesaid, and in which, upon movement of a cassette holder to its operative position, each reel in the cassette housing is axially displaced to be free of the housing walls so as to mimimuze the frictional resistance to rotation of each reel with its associated reel drive drive member.

A further object is to provide a tape recording and/or reproducing apparatus, such as, a video tape recorder, for use with tape cassettes, and which can be portable while in use without the danger that the impacts of impacts necessarily encountered in such use will affect its operation.

In accordance with an aspect of this invention, a tape cassette having at least one tape-carrying reel rotatable and axially displaceable within the cassette housing is provided with a floating member axially movable with the reel between a normal retracted position in respect to the outer surface of the housing and a projecting position extending from the housing, and a tape recording and/or reproducing apparatus for use with such cassette is provided with a holder for receiving the cassette which is movable to an operative position where a reel drive member for each reel extends into the cassette housing and engages the respective reel for controlling the rotation thereof and for axially displacing the reel so as to move the associated floating member to its projecting position where it is engaged by a reel locating member carried by the cassette holder in spaced relation to the cassette housing therein. Thus, the reel locating member, when engaged with the floating member projecting from the cassette housing, cooperates with the reel drive member engaged with the respective reel for firmly establishing a predetermined axial location of the reel even though the orientation of the apparatus may be changed during use.

In accordance with a feature of the invention, each reel locating member is mounted for limited movement in respect to the holder in directions toward and away from the respective floating member of a cassette in the holder, and the reel locating member is spring urged in the direction toward the respective floating member at least during its engagement with the latter.

In one embodiment of the invention, each reel locating member is spring urged in the direction away from the cassette housing when the holder is away from its operative position for increasing the clearance between the reel locating member and cassette housing during the insertion and removal of the latter in respect to the holder, and a dominant or overpowering spring force is applied to urge the reel locating member against the respective floating member of the cassette in response to movement of the cassette holder to its operative position.

The above, and other objects, features and advantages of the invention, will be apparent in the following description of illustrative embodiments thereof which is to be read in connection with the accompanying drawings.

BRIEF DESCRIPTION OF THE DRAWINGS

FIG. 2 is an enlarged top plan view of a tape cassette according to this invention, and which is shown with the top wall of its housing removed;

FIG. 3 is a further enlarged detailed perspective view showing one of the tape positioning members preferably provided in the cassette housing;

FIG. 4 is a view similar to that of FIG. 3, but showing a modified or alternative configuration of the tape positiong member;

DESCRIPTION OF THE PREFERRED EMBODIMENTS

Figure 1:
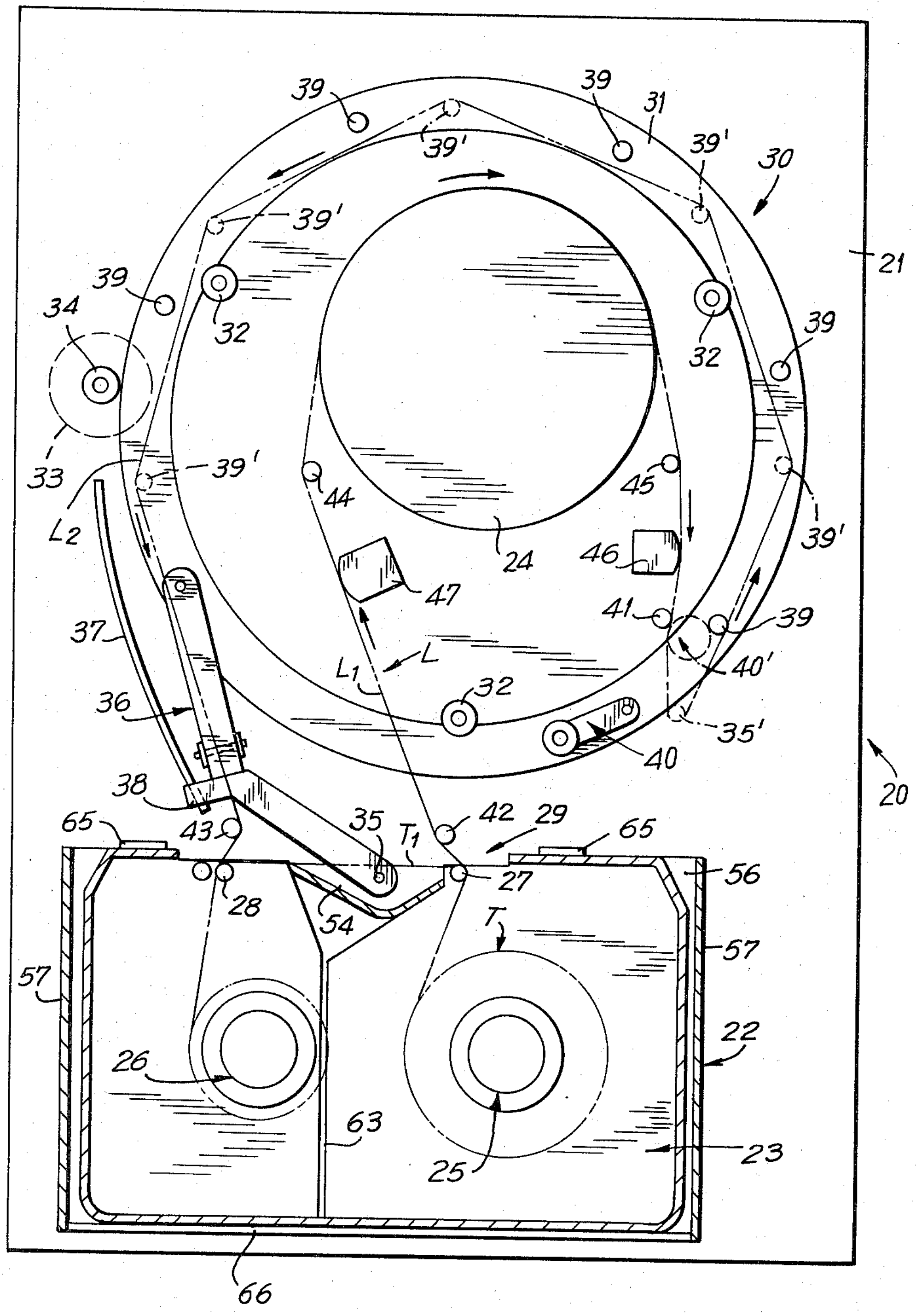
FIG. 1 is a schematic top plan view of one type of tape recording and/or reproducing apparatus with an automatic tape loading device and to which the present invention can be applied.

Referring to the drawings in detail, and initially to FIG. 1 thereof, it will be seen that a cassette-type video tape recording and reproducing apparatus or VTR 20 to which this invention can be applied may have an automatic tape loading device of the type described in detail in the U.S. Pat. No., 3,740,495, identified more fully above. However, it should be understood that the invention is equally applicable to any other magnetic recording and reproducing apparatus in which the magnetic tape is carried by one or more reels within a cassette housing which is received by a cassette holder for disposing the cassette in an operative position in respect to a reel drive member for each reel and in respect to one or more magnetic transducers or heads for recording and/or reproducing signals on the tape either within the cassette housing or on the tape withdrawn from the cassette housing and wrapped at least partly about a guide drum with which the head or heads are associated.

The cassette-type UTR 20 is hereinafter described only to the extent necessary for an understanding of the present invention and is shown schematically to comprise a chassis 21 having a cassette holder 22 mounted above the forward portion of the chassis to receive and support a cassette 23 containing a supply of magnetic tape. The apparatus 20 is further shown to comprise a tape guide drum 24 suitably mounted above the back portion of the chassis 21 and defining a circumferential slot in which one or more rotary heads (not shown) are exposed to scan the magnetic tape when the latter is wrapped about a predetermined extent of the periphery of drum 24.

The magnetic tape T is shown to be wound on a supply reel 25 and a take-up reel 26 which are rotatable within cassette 23, and the tape T extends over guide pins 27 and 28 which are disposed at opposite sides of an opening 29 provided at the back portion of cassette 23 so that a run $T_1$ of the tape extending between reels 25 and 26 will be exposed at cassette opening 29.

The automatic tape loading device 30 of the apparatus 20 is shown to comprise a support member 31, for example, in the form of a circular ring which extends around drum 24. The ring 31 is supported for rotation about its center, for example, by a number of grooved rollers or pulleys 32 which are rotatably supported above the chassis. Support ring 31 is turned by a reversible D.C. electric motor 33 (shown in broken lines on FIG. 1) which is suitably mounted at the underside of the chassis and had its shaft extending upwardly through an opening in the chassis adjacent the periphery of ring 31 and carrying a rubber-surfaced drive roller 34 which frictionally engages the periphery of the ring. Thus, by suitable control of motor 33, support ring 31 can be turned in the clockwise or tape loading direction from its inactive position shown in full lines on FIG. 1 to its operative position shown in broken lines on FIG. 1, and similarly, for unloading the tape, ring 31 can be turned in the counterclockwise direction from its operative position to its initial or inactive position.

A tape engaging member 35 which is shown in the form of an upstanding, rotatable flanged pin or roller is mounted, by way of an arm assembly 36, on support ring 31 so as to move with the latter during turning of the support ring while being movable relative to ring 31 both in the directions generally toward and away from the center of rotation of the ring and in directions generally perpendicular to the plane of rotation of ring 31.

In order to dispose tape engaging member 35 in the position shown on FIG. 1 when ring 31 is in its inactive position, that is, in order to raise arm assembly 36 and swing the latter outwardly relative to ring 31, the tape loading device 30 further includes an arcuate cam plate 37 suitable fixed relative to the chassis so as to extend along a portion of cam ring 31 and to diverge forwardly from the latter to adjacent the cassette holder 22. A cam follower 38 extends from arm assembly 36 and is slidably engageable over the top edge of cam plate 37. The top edge of cam plate 37 is shaped so that, during turning of ring 31 in the counterclockwise direction to the inactive position of FIG. 1, cam follower 38 comes into engagement with the top edge of cam plate 37 and thereafter moves along the cam plate for both raising arm assembly 36 and swinging the arm assembly outwardly away from ring 31. When ring 31 is disposed in its inactive position shown on FIG. 1, cam plate 37 positions arm assembly 36 so that the tape engaging member 35 carried by the latter will extend upwardly into opening 29 at the back of cassette 23 and be disposed in front of the run $T_1$ of the tape which extends between guide pins 27 and 28 and is exposed at the cassette opening. Of course, it is intended that tape engaging member 35 should be disposed at the position shown on FIG. 1 prior to the positioning of the cassette 23 at the operative position thereof on holder or support 22, and further that the cassette 23 should be moved downwardly from above to its operative position, whereby the downward movement of the cassette results in the entry of tape engaging member 35 into cassette opening 29.

Support ring 31 further carries a series of guide pins 39 which extend upwardly from the ring at spaced apart locations along approximately the half of ring 31 which is diametrically opposed to that portion of the ring along which arm assembly 36 extends when it is in overlying relation to the ring. The guide pins 39 define a guide path spaced from the periphery of drum 24 and are engageable by the tape, as hereinafter described, when device 30 is operated to wrap a portion of the tape on a predetermined peripheral extent of drum 24.

Also mounted on support ring 31 is a pinch roller assembly 40, and a capstan 41 which may be driven by a motor (not shown), is disposed inside the circular path of travel of ring 31 and located so that the pinch roller assembly will be adjacent thereto, as indicated at 40′, when ring 31 is turned to its operative position. In order to further guide the tape withdrawn from cassette 23, apparatus 20 has fixed guide pins 42 and 43 disposed in back of, and adjacent to guide pins 27 and 28, respectively, of cassette 23 when the latter is supported on the cassette holder 22. Further, a fixed guide pin 44 is disposed adjacent drum 24 approximately on a line extending tangentially from guide pin 42 to the surface of drum 24, and a guide pin 45 is disposed adjacent drum 24 approximately on a line extending tangentially between drum 24 and capstan 41.

A fixed magnetic recording and/or reproducing head 46 is mounted on the chassis between capstan 41 and guide pin 45 so as to be engaged by the tape when ring 31 is in its operative position, and such fixed magnetic head 46 may be employed for recording and/or reproducing audio and/or control signals on the tape, whereas the rotary head or heads associated with drum 24 may be used for recording and/or reproducing video signals in skewed tracks extending obliquely across the tape. Further, an erasing head 47 is mounted on chassis 21 between guide pins 42 and 44 and may be employed for erasing signals recorded on the tape prior to the recording of new signals on the tape rotary head or head of drum 24.

The above described tape loading device 30 of the VTR 20 is operable as follows:

With ring 31 initially in its inactive position shown in full lines on FIG. 1, a cassette 23 is introduced into holder 22 which is then moved downwardly to its operative position, as hereinafter described, so that tape engaging member 35 extends upwardly into cassette opening 29 in front of the tape run $T_1$ extending across such opening. Upon operation of motor 33 to turn ring 31 in the clockwise direction away from its inactive position, tape engaging member 35 is moved with ring 31 and withdraws tape from cassette 23 to form a tape loop L. The tape loop thus formed includes a side $L_1$ extending from guide pin 27 to tape engaging member 35 and a side $L_2$ returning from member 35 to guide pin 28. As the loop L is being formed and progressively extended in response to clockwise turning of ring 31, pinch roller assembly 40 and guide pins 39 move in succession, under side $L_1$ into the tape loop L, and the side $L_1$ of the progressively enlarged loop L is wrapped about a substantial peripheral extent of drum 24 and is brought adjacent capstan 41 and fixed heads 46 and 47, as shown in broken lines on FIG. 1. Further, as the loop L is lengthened, the other side $L_2$ thereof is engaged by guide pins 39, as indicated at 39′, and held by the latter away from guide drum 24 and fixed heads 46 and 47. Upon reaching its operative position, clockwise rotation of ring 31 is halted and, in such operative position of ring 31, the pinch roller assembly is adjacent capstan 41, as indicated at 40′.

After the above tape loading operation has been completed, pinch roller assembly 40′ can be suitably pressed against capstan 41 to drive the tape therebetween so long as capstan 41 is rotated, for example, during a recording or reproducing operation of VTR 20, at which time tape is unwound from supply reel 25, scanned in skewed tracks by the rotary head or heads associated with guide drum 24, and then rewound on takeup reel 26.

In order to ensure the proper engagement of tape engaging member 35 of device 30 with tape run $T_1$ within cassette 23 at the initiation of the above described tape loading operation, it is necessary that such tape run $T_1$ be disposed in back of member 35 as the cassette is lowered with holder 22 to the operative position of the latter. Thus, if there is slack in the tape between reels 25 and 26, bowing or buckling of tape run $T_1$ in the forward or inward direction away from cassette opening 29 has to be avoided. In order to achieve the foregoing, the cassette 23 according to this invention preferably is provided with a pair of spaced apart positioning members 49 (FIG. 2) mounted within the cassette housing 50 and being engageable with the inner side of the tape run $T_1$ for avoiding inward buckling of that tape run from the straight path between guide pins 27 and 28 disposed at the opposite ends of opening 29. The cassette housing 50 is shown to be generally rectangular and to have substantially rectangular top and bottom walls 51 and 52 (FIGS. 5 and 6) connected by a peripheral wall 53 in which opening 29 is provided along one side of the housing. A cutout 54 is formed in bottom wall 52 (FIG. 2) and extends forwardly from opening 29 in peripheral wall 53 so that tape engaging member 35 can extend upwardly in cutout 54, as shown in broken lines on FIG. 2, and then move rearwardly out of opening 29 for withdrawing the tape from cassette housing 50, as described above.

In order to strengthen the cassette housing 50 and limit access, through opening 29 and cutout 54, to reels 25 and 26 contained in the cassette housing, the latter further includes a partition 55 extending between walls 51 and 52 along the edge of cutout 54. In the embodiment of the invention shown on FIGS. 2 and 3, each of the tape positioning members 49 is shown to be an elongated strip 49*a* of plastic or other resilient material lying in a plane normal to walls 51 and 52 and having a bent forward end portion 49*a* suitably secured to partition 55. The opposite or back end portion 49*c* of strip 49*a* is also shown to be bent or curved for sliding engagement with tape run $T_1$ and is preferably coated with a friction reducing material, such as, polytetrafluoroethylene, as at 49*d*. The spaced apart tape positioning members 49 extending from partition 55 toward opening 29 are disposed so that, with cassette 23 located in holder 22 at the operative position of the latter and with tape loading device 30 in its inactive position, the tape engaging member 35 will be disposed between tape positioning members 49. It will be apparent that during a tape loading operation, member 35 may move rearwardly between members 49 for withdrawing tape from the cassette without any resistance or interference from tape positioning members 49 which remain within the cassette housing 50. Further, during a fast forward or rewinding operation of the VTR 20, that is, when either takeup reel 26 or supply reel 25 is rotated rapidly to transfer tape directly between the reels along the path or run $T_1$, the engagement of tape positioning members 49 with tape run $T_1$ results in only a very small frictional resistance to movement of the tape. The cassette 23 is further shown to have a lid 50*a* (FIG. 2) pivoted on housing 50 and being movable from the illustrated closed position covering opening 29 to an open position in response to movement of the cassette with holder 22 to the operative position of the latter.

As shown on FIG. 4, each of the tape positioning members 49 of FIGS. 2 and 3 may be replaced by a similarly acting tape positioning member 49′ in the form of an elongated resilient strip 49′*a* lying in plane parallel to top wall 51 of housing 50 and being secured, at its forward end portion 49′*b*, to such top wall 51, while the back end portion 49′*c* of the strip is bent downwardly and provided with a friction-reducing coating, as at 49′*d*, for sliding engagement with tape run $T_1$.

Figure 5:
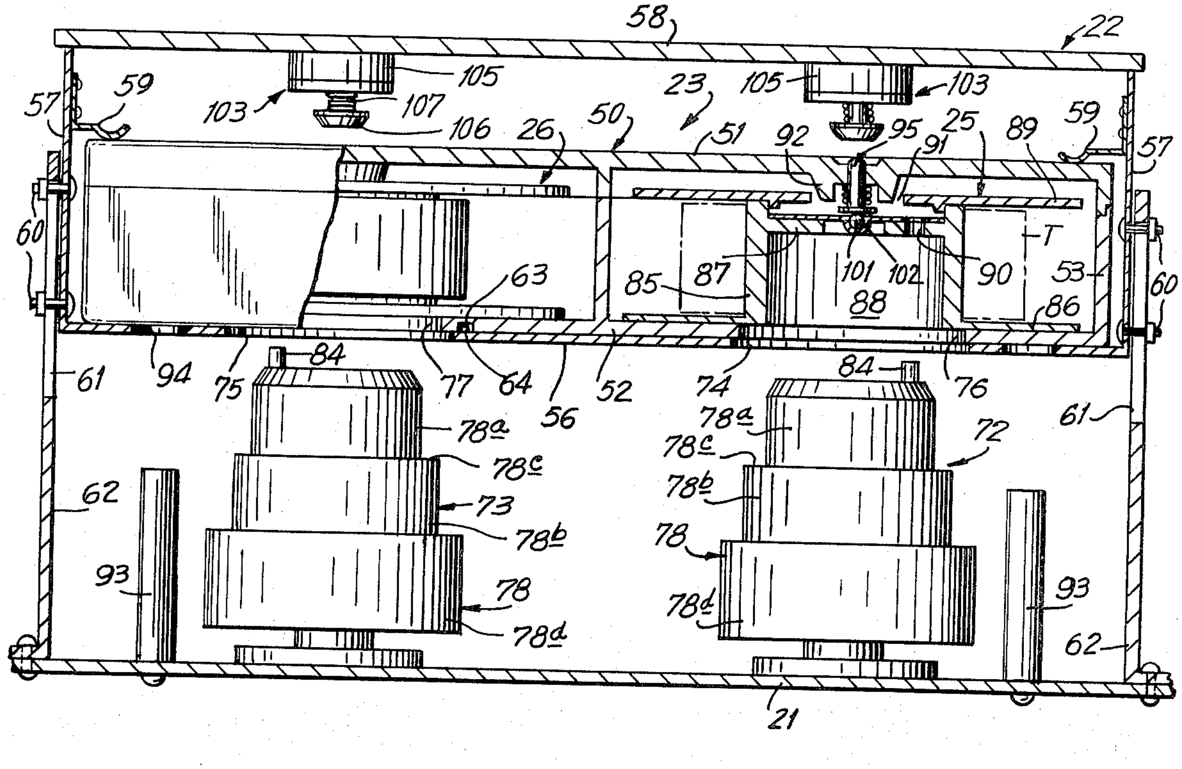
FIGS. 5, 6 and 7 are similar front elevational views, partly broken away and in section, showing a tape cassette according to this invention received in the cassette holder of a tape recording and/or reproducing apparatus, with the cassette holder being illustrated in several positions thereof.
Figure 6:
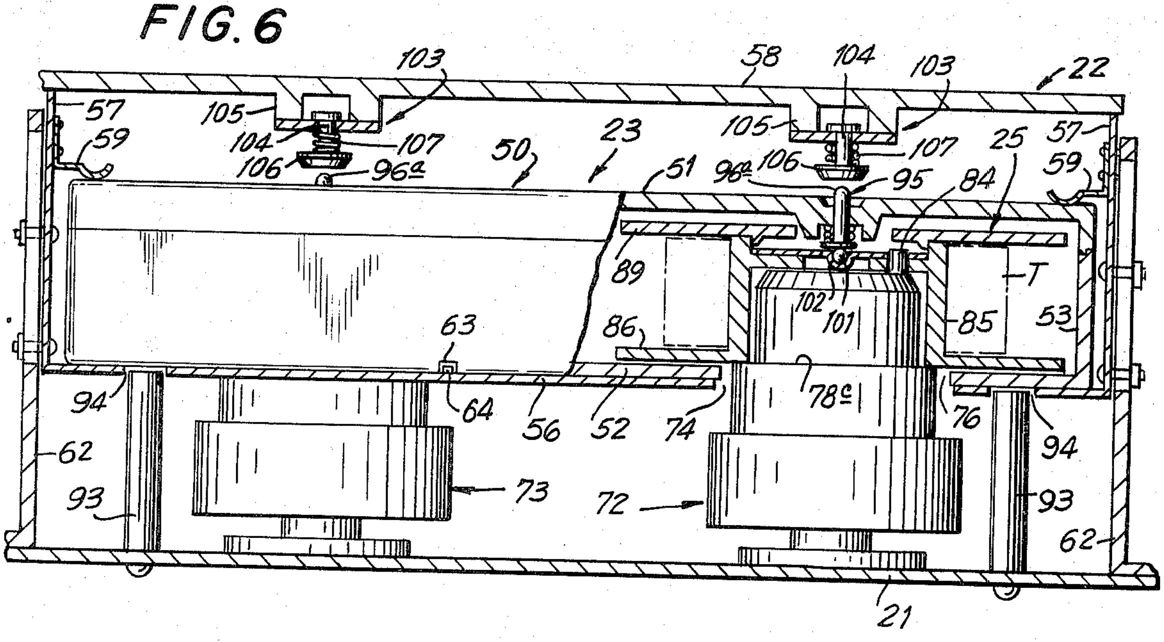
Figure 7:
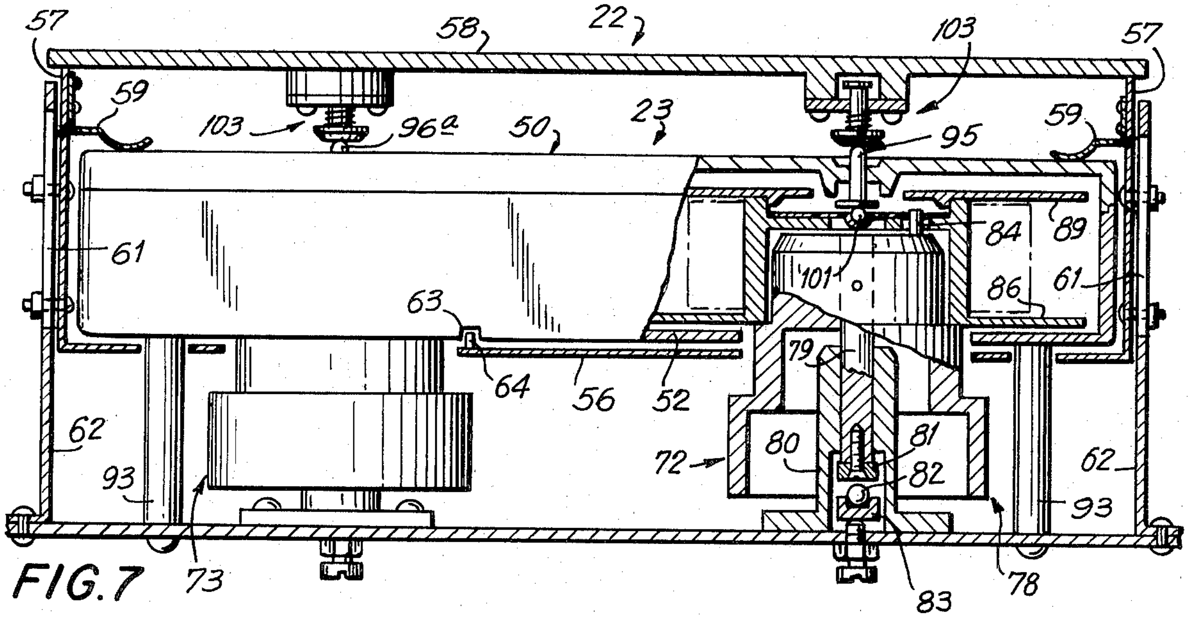

Referring now to FIGS. 5, 6 and 7, it will be seen that the cassette holder 22 includes a base plate 56, side walls 57 extending upwardly from the opposite side edges of base plate 56, and a cross member 58 extending between side walls 57 and spaced upwardly from base plate 56 by a distance substantially greater than the thickness of cassette housing 50 so as to be spaced substantially from top wall 51 of the cassette housing when the latter rests on base plate 56. Resilient clips 59, for example, of spring metal, extend inwardly from side walls 57 and are engageable slidably with top wall 51 of the cassette housing only adjacent the opposite sides of the latter, that is, away from the portions of top wall 51 that bear printing of other indicia or designs. Such resilient clips 59 yieldably urge cassette housing 50 downwardly against base plate 56 after the cassette housing has been slidably inserted into holder 22 through the open front of the latter.

In order to mount holder 22 for movement relative to chassis 21 between its cassette receiving position (FIG. 5) where it is elevated or has its base plate 56 spaced a relatively large distance from chassis 21, and its operative or lowered position (FIG. 7), where base plate 56 is spaced a relatively smaller distance from chassis 21, side walls 57 of holder 22 have bolts 60 extending outwardly therefrom and being slidably received in slots 61 provided in supports 62 extending perpendicular to chassis 21 and secured to the latter.

In order to locate cassette housing 50 in holder 22 in the direction parallel to the side of housing 50 along which opening 29 extends, the bottom wall 52 of the cassette housing has a guide slot or groove 63 (FIGS. 1 and 2) extending at right angles to that side of the housing from cutout 54 and preferably having a diverging end portion 63*a* adjacent the cutout, and base plate 56 of holder 22 has an elongated ridge or projection 64 (FIGS. 5, 6 and 7) which is slidably engageable in slot or groove 63 as the cassette housing is inserted into the holder. In order to locate or position cassette housing 50 in the direction along slot or groove 63, that is, in the direction perpendicular to the side of cassette housing 50 along which opening 29 extends, base plate 56 of holder 22 has abutments or lugs 65 (FIG. 1) extending upwardly from its edge facing toward guide drum 24 of VTR 20 and being spaced apart so as to be engaged by cassette housing 50 adjacent the opposite ends of opening 29. Further, the edge of base plate 56 remote from abutments 65 may have an upstanding flange 66 over which cassette housing 50 is inserted into holder 22. Such flange 66 may engage the side of cassette housing 50 remote from opening 29 when housing 50 engages abutments 65 for holding the cassette housing against movement, in the direction of slot or groove 63, relative to holder 22.

Figure 10:
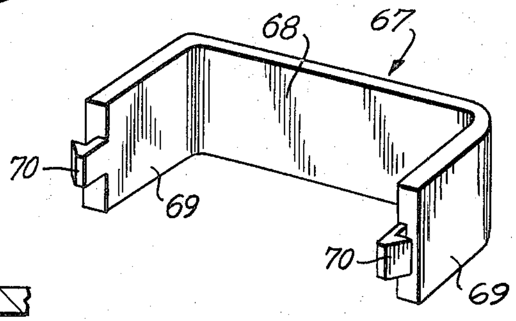
FIG. 10 is a perspective view of a cassette positioning member which is adapted to be removably mounted on the cassette, as shown in broken lines on FIG. 2.

As will be hereinafter described in detail, the present invention is most advantageously applicable to a portable VTR, in which case the tape cassettes 23 for use with such portable VTR will preferably have smaller housings than the tape cassettes intended for use with a stationary VTR. Thus, the holder 22 of the portable VTR will have its abutments 65 and flange 66 spaced apart by a distance corresponding to the relatively small dimension of housing 50 of the tape cassette intended for use with the portable VTR, whereas the holder 22′ of a stationary VTR shown in broken lines on FIG. 2 will have a larger distance between its abutments 65′ and flange 66′ so as to accommodate therebetween the relatively larger tape cassettes intended for use therewith. However, it is desirable to adapt the relatively smaller tape cassettes 23 for use in a stationary VTR and, for this purpose, a cassette positioning member 67 (FIGS. 2 and 10) is provided for removable attachment to the side of cassette housing 50 remote from opening 29. The illustrated cassette positioning member 67, which may be formed of a resilient plastic, is shown to include an elongated portion 68 having resilient arms 69 extending from its opposite ends and terminating in claw-like extensions 70 which are engageable in suitably located holes 71 in peripheral wall 53 of the cassette housing. When arms 69 are flexed toward each other, claw-like extensions 70 can be withdrawn from holes 71 for removing cassette positioning member 67 from cassette housing 50 and thereby adapting the cassette 23 for reception in the holder 22 of the portable VTR. When the cassette 23 is to be used in a stationary VTR, cassette positioning member 67 is mounted on cassette housing 50, as shown in broken lines on FIG. 2, and is engageable by flange 66′ of holder 22′ for retaining the cassette housing against the locating lugs or abutments 65′.

Thus, upon the insertion of cassette 23 into holder 22 or 22′, the cassette housing 50 is located to ensure that movement of holder 22 to its operative lowered position will cause tape engaging member 35 to extend into cutout 54 between tape positioning members 49 at the inner side of tape run $T_1$. However, the proper engagement of member 35 of tape loading device 30 with tape run $T_1$ in cassette 23 further requires that such tape run, and hence the reels 25 and 26 between which it extends, be at a precisely predetermined level in respect to chassis 21 when holder 22 is in its operative position. Such precise determination of the level of reels 25 and 26 is also of critical importance in ensuring the proper scanning of the skewed tracks on the tape by the rotary head or heads of guide drum 24 during recording or reproducing operations of VTR 20. The precise determination of the level of reels 25 and 26 in respect to chassis 21 cannot be established reliably by locating cassette housing 50 by reason of the fact that reels 25 and 26 are axially displaced between walls 51 and 52 so as to be spaced from the latter (FIG. 7) during operation of the VTR 20. Thus, in accordance with this invention, when holder 22 is moved to its lowered or operative position, the level of the reels 25 and 26 contained in the housing of a cassette 23 within holder 22 is determined by reel drive members 72 and 73 (FIGS. 5, 6 and 7) which extend from chassis 21 and which are adapted to project through respective openings 74 and 75 in base plate 56 and through respective apertures 76 and 77 in bottom wall 52 of housing 50 into engagement with the respective reels 25 and 26.

As shown particularly on FIG. 7 in respect to reel drive member 72, each of reel drive members 72 and 73 includes a hollow stepped cylindrical body 78 which opens downwardly and contains a shaft 79 that is journalled in a bearing holder 80 secured on chassis 21. Shaft 79 is retained in bearing holder 80 by a disk 81 secured to the lower end of shaft 79 and resting on a thrust bearing 82 on an adjustable carrier 83 within holder 80. It will be apparent that the axial position of each rotatable reel drive member 72 or 73 relative to chassis 21 can be varied by adjusting the respective thrust bearing carrier 83.

The stepped cylindrical body 78 of each of the reel drive members 72 and 73 is shown (FIG. 5) to include an upper reduced-diameter end portion 78*a* having a beveled end edge, an intermediate portion 78*b* of larger diameter than end portion 78*a* to define an upwardly facing, annular support shoulder 78*c* therebetween, and a lower end portion or skirt 78*d* which can be selectively engaged by a suitable drive mechanism (not shown) for controlling the rotation of the drive member 72 or 73. Further, a coupling pin 84 projects from the end surface of body 78 and is spaced radially from the axis of rotation of the latter.

In the illustrated embodiment of the invention, each of the reels 25 and 26 is shown to include a hollow reel hub 85 having a radial flange 86 extending outwardly from its lower end, that is, the end adjacent cassette housing wall 52, and an end wall 87 extending across the opposite or upper end portion of hub 85 so that the latter defines a downwardly opening socket 88 dimensioned to receive the end portion 78*a* of the respective reel drive member 72 or 73 (FIG. 5). An upper flange 89 is suitably secured on the upper end of hub 85 so that tape T can be wound on hub 85 between flanges 86 and 89. One or more openings or recesses 90 are formed in end wall 87 of hub 85 and spaced from the axis of rotation of the reel similarly to the coupling pin 84 on the respective reel drive member 72 or 73 so that, when end portion 78*a* of the reel drive member is inserted in socket 88, coupling pin 84 engages in an opening or recess 90 for rotatably coupling the reel with the respective reel drive member. The depth of socket 88 is selected to be slightly greater than the axial dimension of end portion 78*a* of each reel drive member 72 or 73 so that the open end of hub 85 will come to rest on annular support shoulder 78*c* at a time when clearance still exists between the upper end surface of body 78 and wall 87 of hub 85 (FIGS. 6 and 7).

Figure 8:
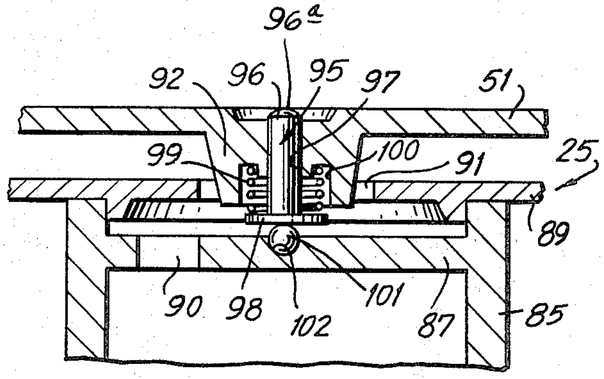
FIG. 8 is an enlarged, fragmentary sectional view illustrating the floating member associated with each reel in a tape cassette according to one embodiment of this invention, and which is shown in its retracted position.

As previously mentioned, the reels 25 and 26 are loosely disposed in cassette housing 50, that is, each reel has an axial dimension smaller than the distance between housing walls 51 and 52 so as to be axially displaceable and rotatable within housing 50. In order to loosely locate each of reels 25 and 26 in housing 50 with the open end of the socket 80 substantially registered with the respective aperture 76 or 77 in wall 52, the flange 89 of each reel may have a central opening 91 (FIG. 8) which loosely receives a respective boss 92 formed on the inner surface of cassette housing wall 51.

The precise level of cassette housing 50 relative to chassis 21 when holder 22 is moved to its operative position (FIG. 7) is preferably determined by cassette locating posts 93 which project from chassis 21 under holder 22 and are aligned with openings 94 in base plate 56 (FIGS. 5 and 6). When holder 22 is moved to its lowered or operative position, the upper end portions of posts 93 extend through the respective openings 94 and engage cassette housing wall 52 to move cassette housing 50 slightly away from base plate 56 of the holder (FIG. 7) against the force of spring clips 59. The level of the annular support shoulders 78*c* on reel drive members 72 and 73 is selected in relation to the level of the upper end surfaces of posts 93 so that, with holder 22 in its operative position (FIG. 7), the flange 86 of each reel supported on the respective shoulder 78*c* is spaced slightly from the cassette housing wall 52 supported on posts 93. Further, in such operative position of holder 22 the flange 89 of each reel is spaced from cassette housing wall 51. Thus, walls 51 and 52 will not offer frictional resistance to rotation of reels 25 and 26 with the respective reel drive members 72 and 73.

The foregoing arrangement adequately determines the level of reels 25 and 26 in respect to chassis 21 so long as the latter remain substantially horizontal and is not subjected to impacts or shocks, for example, as in a stationary VTR. However, in the case of a portable VTR, operations of the VTR may be performed with the chassis 21 in a vertical or other non-horizontal orientation and the portable VTR may be subjected to impacts or shocks when in use, in which case reels 25 and 26 may move axially relative to cassette housing 50 in the direction away from the respective support shoulders 78*c* so as to change the level of reels 25 and 26 in respect to chassis 21.

In accordance with the present invention, each of reels 25 and 26 is firmly held at the level established by the annular support shoulder 78*c* on the respective drive member 72 or 73 upon the movement of holder 22 to its operative position (FIG. 7). This purpose is achieved by providing cassette 23 with a floating member 95 for each of reels 25 and 26. Each floating member 95 (FIG. 8) includes a stem 96 extending slidably through a bore 97 which is centered in a respective boss 92, and a head 98 having a plane surface facing toward wall 87 of the respective reel at the inner end of stem 96. A helical spring 99 is seated in a cavity 100 of boss 92 around stem 96 and bears against head 98 to normally urge floating member 95 to a retracted position (FIGS. 5 and 8) in which the outer end 96*a* of stem 96 is inside the outer surface of cassette housing wall 51. Each floating member 95 is axially coupled with the respective reel 25 or 26 so as to move axially with the latter, and such axial coupling is preferably achieved by means of a thrust bearing arrangement having substantially point contact so that frictional resistance to rotation of the reel will be minimized. In the embodiment of FIGS. 5–8, the thrust bearing arrangement is constituted by a ball bearing 101 seated in a cavity 102 provided at the center of end wall 87 of the reel hub and having point contact with the plane surface of head 98 on floating member 95.

Figure 9:
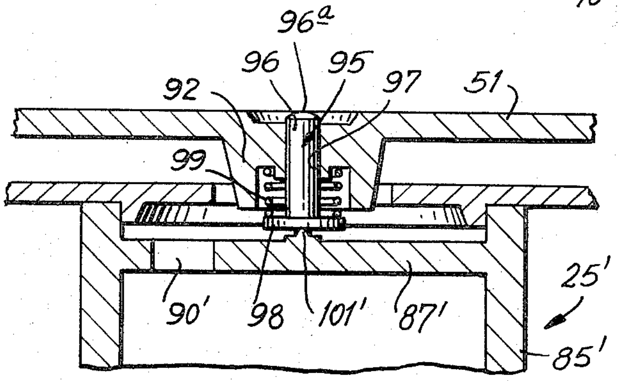
FIG. 9 is a view similar to that of FIG. 8, but showing another embodiment of the invention.

In the alternative thrust bearing arrangement shown on FIG. 9, the end wall 87′ of the hub 85′ of the reel 25′ has a central projection or nipple 101′ extending into substantially point contact with the plane surface of head 98 on the associated floating member 95.

In either case, that is, with the thrust bearing arrangement of FIGS. 5–8 or of FIG. 9, the movement of floating member 95 to its retracted position by means of spring 99 is accompanied by axial displacement of the respective reel 25 or 26 against wall 52 of the cassette housing. Thus, when cassette 23 is not in use, flange 86 of each reel is urged against the adjacent wall 52 (FIG. 5) and such engagement frictionally resists turning of reels 25 and 26 and the inadvertent loosening of the tape wound thereon. If desired, the inner surface of wall 52 may be coated with a frictional material, at least at the regions coinciding with flanges 86 of reels 25 and 26 to enhance the braking effect of the engagement of flanges 86 with wall 52.

However, when reels 25 and 26 are axially displaced away from cassette housing wall 52 in response to movement of holder 22 to its operative position, as described above, the accompanying axial displacement of the respective floating members 95 causes movement of the latter to projecting positions thereof (FIGS. 6 and 7) in which the outer ends 96*a* of stems 96 project substantially beyond the outer surface of cassette housing wall 51.

Further, in accordance with this invention, the cassette holder 22 of VTR 20 is provided with a reel locating device 103 for each of the reels 25 and 26. Each reel locating device 103 is positioned in holder 22 so as to be spaced from wall 51 of a cassette housing 50 received in the cassette holder (FIG. 5) and to be engageable by the respective floating member 95 in the projecting position of the latter (FIG. 7) for cooperation with the reel drive member 72 or 73 in firmly establishing the desired axial location or level of the respective reel in relation to chassis 21.

As shown particularly on FIG. 5, in the embodiment of the invention presently being described, each reel locating device 103 includes a plunger 104 axially slidable to a limited extent in a housing 105 depending from cross-member 58 of holder 22 and having a head or bearing member 106 at the outer end of plunger 104 which is aligned with the respective floating member 95. A helical spring 107 extends around plunger 104 between housing 105 and head 106 to urge the latter in the direction toward base plate 56 to the position shown on FIGS. 5 and 6 in which head 106 is substantially spaced from wall 51 of cassette housing 50 as the latter is inserted into holder 22.

It will be seen that, when a cassette 23 inserted in holder 22 is moved toward chassis 21 in the course of movement of holder 22 to its operative position, the seating of the reel hubs 85 on shoulders 78*c* of reel drive members 72 and 73 occurs before the engagement of housing wall 52 with posts 93 (FIG. 6) and commences the axial displacement of reels 25 and 26 away from wall 52 and the accompanying movement of floating members 95 to their projecting positions. As movement of holder 22 to its operative position continues, the displacement of floating members 95 to their projecting positions is completed and the cassette housing 50 is engaged by posts 93 and moved away from base plate 56 of the holder (FIG. 7) with the result that the projecting ends 96*a* of floating members 95 are engaged with the heads or bearing members 106 of the respective reel locating devices 103. Thus, with holder 22 in its operative position, springs 107 of reel locating devices 103 strongly urge the respective reels 25 and 26 against shoulders 78*c* on reel drive members 72 and 73 even if chassis 21 is disposed vertically or inverted from the position shown on FIGS. 5–7. Accordingly, the level of reels 25 and 26 is firmly established in a VTR which may be portable when in use. It will also be noted that the reel locating devices 103 never engage the cassette housing 50 and, therefore, cannot mar or damage indicia or designs printed or otherwise applied on wall 51 of the cassette housing.

Apart from firmly establishing the level of reels 25 and 26 during operations of VTR 20, the reel locating devices 103 of holder 22 in cooperation with floating members 95 of cassette 23 ensure that, in a portable VTR, the reels 25 and 26 will not move axially on the respective reel drive members 72 and 73 so as to disengage the coupling pins 84 from the associated openings or recesses 90 of the reels. Thus, the rotatable coupling of reels 25 and 26 with reel drive members 72 and 73 is ensured without regard to the orientation of the portable VTR 20 during operation of the latter.

Figure 11:
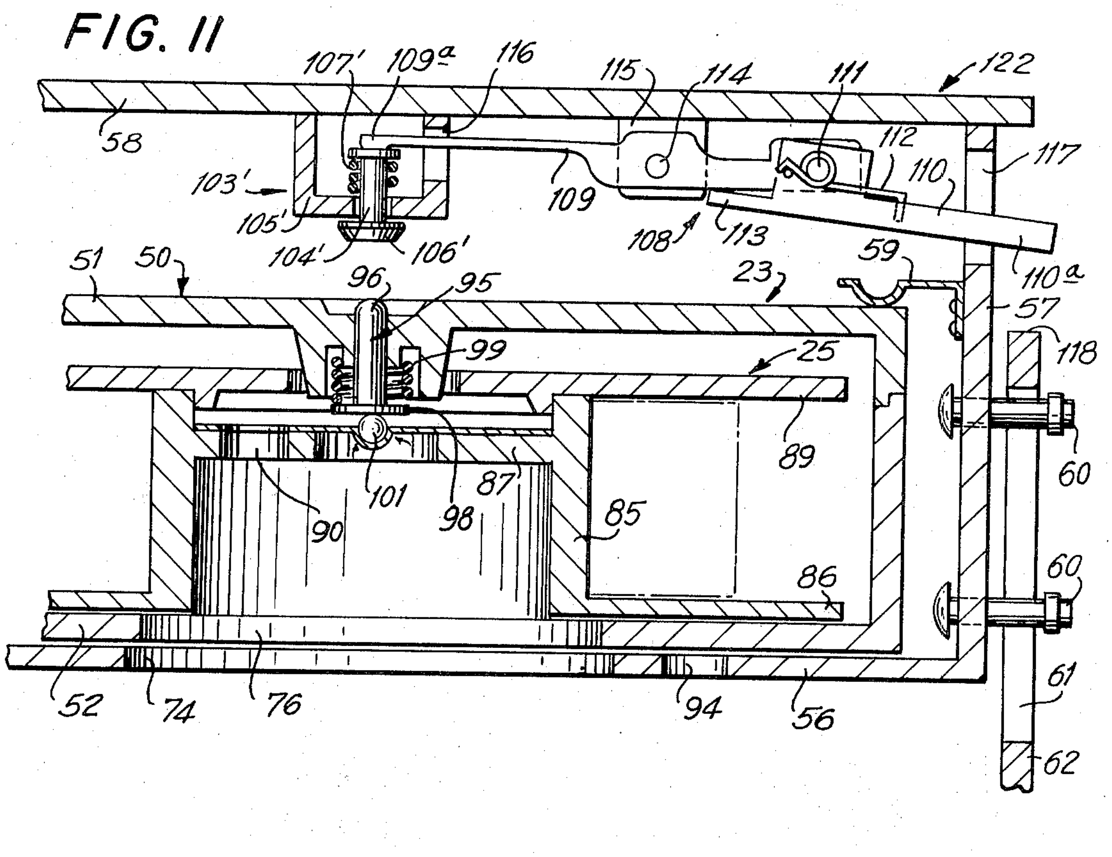
FIGS. 11 and 12 are fragmentary, enlarged vertical sectional views of a cassette holder according to another embodiment of this invention and which is shown in its cassette receiving and operative positions, respectively.
Figure 12:
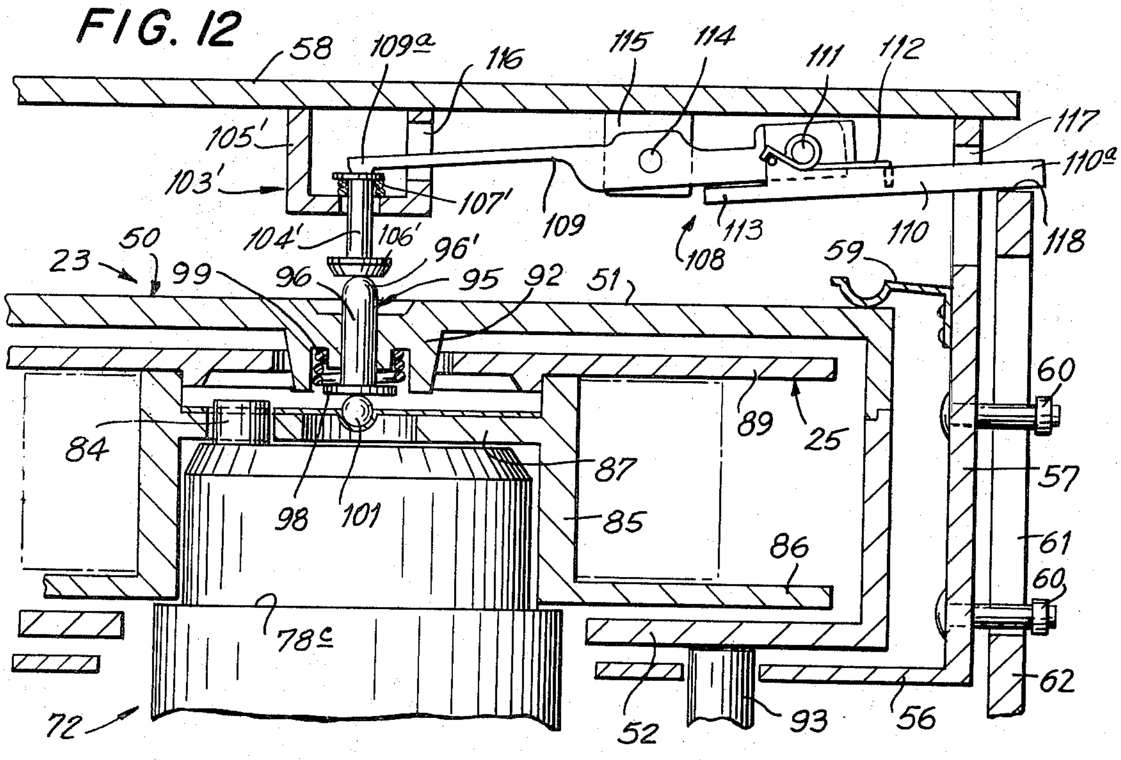

Referring now to FIGS. 11 and 12 illustrating another embodiment of this invention, it will be seen that the cassette 23 of that embodiment is the same as that previously described and that the cassette holder 122 is similar to the previously described cassette holder 22 and differs therefrom only in respect to its reel locating devices 103' which replace the previously described devices 103. Each reel locating device 103' is shown to include a plunger 104' mounted for limited axial movement in respect to its housing 105' and having a head 106' engageable by the respective floating member 95 in the projecting position of the latter. However, the plunger 104' is normally urged by a spring 107' within housing 105' in the direction away from floating member 95, that is, away from base plate 56 of holder 22 (FIG. 11) so as to increase the clearance between each device 103' and the wall 51 of cassette housing 50 during the insertion and removal of the cassette with holder 22 in its elevated or cassette receiving position.

Each reel locating device 103' further includes a lever arm assembly 108 which, in response to movement of holder 22 to its operative position (FIG. 12), applies a spring force to the associated plunger 104' which is effective to overcome the force of spring 107' and to move plunger 104' in the direction toward base plate 56 to a position where its head 106' can engage the respective floating member 95 in the projecting position of the latter. The lever arm assembly 108 is shown to include first and second lever arms 109 and 110 which are pivotally connected to each other as at 111. A torsion spring 112 is associated with the pivot 111 for urging lever arm 110 in the clockwise direction, as viewed, relative to lever arm 109 to the position in which an extension 113 of lever arm 110 abuts against lever arm 109 (FIG. 11). The lever arm assembly 108 is pivotally mounted, intermediate the ends of lever arm 109, on a pivot 114 carried by a bracket 115 depending from cross-member 58 between housing 105' of the respective reel locating device 103' and the adjacent side wall 57 of holder 22. Lever arm assembly 108 is longitudinally dimensioned so that the free end portion 109*a* of lever arm 109 projects through a slot 116 in housing 105' for engagement with the end of plunger 104' therein, while the free end portion 110*a* of lever arm 110 projects outwardly through a slot 117 in the adjacent side wall 57 for engagement with an abutment 118, for example, defined by the upper end of the adjacent support 57, as shown. It will be seen that abutment 118 projects into the path along which end portion 110*a* of lever arm assembly 108 moves toward the chassis upon movement of holder 22 to its operative position.

When holder 22 is in its elevated or cassette receiving position, each of its reel locating devices 103' is in the position shown on FIG. 11 with head 106' of its plunger 104' held against housing 105' at a relatively large distance from base plate 56 to provide a maximum clearance or spacing from top wall 51 of the cassette housing as the latter is being inserted in, or removed from holder 22 with the floating members 95 of the cassette 23 in their retracted positions. Further, the end of plunger 104' within housing 105' acts against end portion 109*a* of lever arm assembly 108 to pivot the latter, as a unit, about pivot 114 to the position shown on FIG. 11 in which end portion 110*a* of lever arm 110 is spaced from abutment 118.

When holder 22 is moved to its operative position (FIG. 12), the engagement of the reels by the respective reel drive members causes axial displacement of the reels relative to cassette housing 50 and corresponding axial displacement of floating members 95 to their projecting position, and the engagement of locating posts 93 with cassette housing 50 causes displacement of the latter away from base plate 56 of holder 22, all as previously described in connection with FIGS. 5–7. However, in the embodiment of FIGS. 11 and 12, the movement of holder 22 to its operative position (FIG. 12) causes similar movement of lever arm assembly 108 so that end portion 110*a* thereof is engaged by abutment 118 which causes counterclockwise turning of lever arm assembly 108 to the position of FIG. 12. As a result of such turning of lever arm assembly 108, end portion 109*a* of the latter acts on the associated plunger 104' to move the latter against the force of spring 107' and thereby decrease the distance between the head 106' and base plate 56 so that each floating member 95, in its projecting position, engages the head 106' of the associated reel locating device 103' for firmly establishing the axial location of the respective reel.

It will be apparent that the force exerted by spring 112 to maintain lever arms 109 and 110 in the relative positions thereof shown on FIG. 11 is substantially greater than the force exerted by spring 107' to resist movement of plunger 104' to the position shown on FIG. 12. Thus, when holder 22 is in its operative position and head 106' of each reel locating device 103' engages the respective floating member 95, spring 112 is effective to yieldably urge head 106' in the direction toward floating member 95. In order to achieve the foregoing, the several parts of each reel locating device 103' are preferably dimensioned so that head 106' will be moved relative to housing 105' into engagement with the respective floating member 95 in the projecting position of the latter prior to the final increment of movement. Therefore, during such final increment of movement of holder 22 to its operative position, lever arm 110 will turn in the counterclockwise direction in respect to lever arm 109, that is, in the direction opposed to the force of spring 112, to the relative position shown on FIG. 12 in which extension 113 of arm 110 is spaced from arm 109.

Although illustrated embodiments of this invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. A tape cassette comprising a housing having two substantially parallel opposed walls, at least one reel having tape wound thereon and being contained in said housing for rotation about an axis substantially normal to said walls and for axial displacement between said walls, one of said walls having a bore therein which is substantially centered in respect to said reel, a floating member axially movable in said bore and having means at the inner end of said floating member within said housing for engagement axially with said reel, means urging said floating member and said reel axially toward the other of said walls for normally disposing said floating member in a retracted position in respect to said one wall, and an aperture in said other wall which is substantially centered in respect to said reel and through which the latter is adapted to be engaged for controlling the rotation of said reel and for axially displacing the reel toward said one wall so as to similarly displace said floating member to a projecting position in respect to said one wall and at which said floating member is engageable outside of said housing for firmly establishing a predetermined axial location of said reel.

2. A tape cassette as in claim 1; in which said means at the inner end of the floating member for engagement axially with the reel includes thrust bearing members on said floating member and reel, respectively, and having substantially point contact with each other for minimizing the frictional resistance to rotation of said reel relative to said floating member.

3. A tape cassette as in claim 2; in which said thrust bearing members are respectively constituted by a plane surface and a ball bearing engaging said plane surface.

4. A tape cassette as in claim 3; in which said plane surface is provided on said inner end of the floating member, and said reel has a central recess in which said ball bearing is seated.

5. A tape cassette as in claim 2; in which said thrust bearing members are respectively constituted by a plane surface at said inner end of said floating member and a central projection extending from said reel into said point contact with said plane surface.

6. A tape cassette as in claim 1; in which said means urging said floating member and said reel axially toward said other wall includes a spring within said housing acting on said floating member and, through the latter, on said reel.

7. A tape cassette as in claim 1; in which said housing has an opening along a side thereof, guide means are provided within said housing adjacent opposite ends of said opening for directing a run of the tape in a path along said opening, and a pair of spaced apart tape positioning members are mounted within said housing and are engageable with the inner side of said tape run for preventing inward buckling of said tape run from said path.

8. A tape cassette as in claim 7; in which each of said tape positioning members is in the form of a resilient finger secured, at one end, to said housing and having its other end adapted for slidable engagement with said tape run.

9. A tape cassette as in claim 1; in which said two walls are substantially rectangular and connected by a third wall extending therebetween along the peripheries of said two walls, said third wall has an opening extending along one side of said housing and along which a run of said tape is guided, said other wall has a cutout extending from said opening and through which said tape run is engageable for withdrawing the tape from said housing through said opening, said other wall further has a guide slot extending from said cutout substantially at right angles to said one side of the housing and by which said housing can be positioned in the direction of said one side thereof, and a cassette positioning member extends removably from the side of said housing opposed to said one side for positioning the housing in the direction of said slot in the event that the cassette is received in a holder substantially larger than said housing.

10. A tape cassette as in claim 9; in which said third wall has a pair of holes therein spaced apart along said opposed side of the housing, and said cassette positioning member includes an elongated portion having resilient arms extending from its opposite ends and terminating in claw-like extensions which are engageable in said holes for securing said cassette positioning member to said third wall, said claw-like extensions being removable from said holes upon flexing of said arms.

11. The combination of a tape cassette comprising a housing having two substantially parallel opposed walls, at least one reel having tape wound thereon and being contained in said housing for rotation about an axis substantially normal to said walls and for axial displacement between said walls, one of said walls having a bore therein which is substantially centered in respect to said reel, a floating member axially movable in said bore and having means at the inner end of said floating member within said housing for engagement axially with said reel, means urging said floating member and said reel axially toward the other of said walls for normally disposing said floating member in a retracted position in respect to said one wall, said floating member being movable away from said other wall to a projecting position extending out of said end wall, and an aperture in said other wall which is substantially centered in respect to said reel; and a tape recording and/or reproducing apparatus comprising a chassis having a rotatable reel drive member extending therefrom for each said reel of said cassette, a cassette holder including a base plate having an opening for each said reel drive member and through which the latter is adapted to extend, means mounting said cassette holder for movement in respect to said chassis between a cassette receiving position, in which said base plate is spaced from said reel drive member and the cassette is receivable in said holder with said other wall of the housing against said base plate, and an operative position of said holder in which said base plate is relatively closer to said chassis so that each said reel drive member extends through the respective opening of said base plate and aperture of said other wall of the housing into engagement with the respective reel for controlling the rotation of said reel and for displacing said reel toward said one wall of the housing so as to similarly displace said floating member to said projecting position, and reel locating means carried by said holder so as to be spaced from said one wall of the housing of a cassette received by said holder, said reel locating means being engageable with said floating member in said projecting position of the latter for cooperation with said reel drive member in firmly establishing a predetermined axial location of the respective reel in relation to said chassis.

12. The combination as in claim 11; in which said reel locating means is mounted for limited movement in respect to said holder in the directions toward and away from said floating member, and spring means yieldably urges said reel locating means toward said floating member at least during its engagement with the latter.

13. The combination as in claim 12; in which second spring means urges said reel locating means in the direction away from said floating member when said holder is in its cassette receiving position so as to increase the clearance between said reel locating means and said one wall of the cassette housing during the insertion and removal of a cassette in said holder, and means responsive to movement of said holder to its operative position makes the first mentioned spring means operative to overcome said second spring means.

14. The combination as in claim 13; in which said means making said first spring means operative to overcome the second spring means includes a lever arm assembly pivoted on said holder and engageable at one end with said reel locating means in said direction toward the floating member, and abutment means on said chassis engageable by the other end of said lever arm assembly for pivoting the latter in the direction to move said reel locating means in said direction toward said floating member in response to movement of said holder to said operative position; and in which said lever arm assembly includes first and second lever arms connected by said first spring means so that the force for moving said reel locating means in said direction toward said floating member is transmitted by way of said first spring means.

15. The combination as in claim 11; in which said cassette holder includes means engageable with said one wall of the housing only adjacent the periphery of the latter for yieldably holding said other wall of the housing against said base plate of the holder, said chassis has cassette locating posts extending therefrom, and said base plate has openings registering with said posts and through which the latter extend into engagement with said other wall of the cassette housing when said holder is moved to said operative position.

16. The combination as in claim 11; in which said means at the inner end of the floating member for engagement axially with the reel includes thrust bearing members on said floating member and reel, respectively, and having substantially point contact with each other for minimizing the frictional resistance to rotation of said reel relative to said floating member.

17. The combination as in claim 16; in which said thrust bearing members are respectively constituted by a plane surface and a ball bearing engaging said plane surface.

18. The combination as in claim 17; in which said plane surface is provided on said inner end of the floating member, and said reel has a central recess in which said ball bearing is seated.

19. The combination as in claim 16; in which said thrust bearing members are respectively constituted by a plane surface at said inner end of said floating member and a central projection extending from said reel into said point contact with said plane surface.

20. The combination as in claim 11; in which said means urging said floating member and said reel axially toward said other wall includes a spring within said housing acting on said floating member and, through the latter, on said reel.

21. The combination as in claim 11; in which said housing has an opening along a side thereof, guide means are provided within said housing adjacent opposite ends of said opening for directing a run of the tape in a path along said opening, and a pair of spaced apart tape positioning members are mounted within said housing and are engageable with the inner side of said tape run for preventing inward buckling of said tape run from said path.

22. The combination as in claim 21, in which each of said tape positioning members is in the form of a resilient finger secured, at one end, to said housing and having its other end adapted for slidable engagement with said tape run.

23. The combination as in claim 11; in which said two walls of the cassette housing are substantially rectangular and connected by a third wall extending therebetween along the peripheries of said two walls, said third wall has an opening extending along one side of said housing and along which a run of said tape is guided, said other wall has a cutout extending from said opening of the third wall and a guide slot extending from said cutout substantially at right angles to said one side of the housing, and a cassette positioning member extends removably from the side of said housing opposed to said one side; and in which said holder has a guide projection extending from said base plate and engaging in said guide slot for positioning said housing in the direction of said one side thereof, said holder further has a portion engageable by said cassette positioning member on the housing for positioning the latter in the direction of said guide slot, and said tape recording and/or reproducing apparatus further comprises tape engaging means insertable into said cutout of a cassette housing thus positioned in said holder upon movement of the latter to its operative position and being effective to engage said tape run for withdrawing the tape from said housing through said opening in the third wall thereof.

24. A tape recording and/or reproducing apparatus for use with a tape cassette which includes a housing containing at least one rotatable reel having tape wound thereon and being engageable through an aperture in the housing for controlling the rotation of the reel and for axially displacing the latter, and a floating member axially movable with the reel between a normal retracted position in respect to the outer surface of the housing and a projecting position extending from the housing; said apparatus comprising a chassis having a rotatable reel drive member extending therefrom for each reel of the cassette, a cassette holder including a base plate having an opening through which said reel drive member is adapted to extend, means mounting said holder for movement in respect to said chassis between a cassette receiving position, in which said base plate is spaced from said reel drive member and a cassette is receivable on said base plate of the holder, and an operative position of said holder in which said base plate is relatively closer to said chassis so that said reel drive member extends through said base plate and is adapted to engage the respective reel for controlling the rotation of the latter and for displacing the reel axially away from said base plate so as to similarly displace said floating member to said projecting position, and reel locating means carried by said holder so as to be spaced from the cassette housing when the latter is received in said holder, said reel locating means being adapted to engage the floating member of a cassette in the projecting position thereof for cooperating with said reel drive member in firmly establishing a predetermined axial location of the reel in relation to said chassis.

25. A tape recording and/or reproducing apparatus as in claim 24; in which said reel locating means is mounted for limited movement in respect to said holder in the directions toward and away from said base plate, and spring means yieldably urges said reel locating means toward said base plate at least during the presence of said holder in saod operative position thereof.

26. A tape recording and/or reproducing apparatus as in claim 25; in which second spring means urges said reel locating means in the direction away from said base plate when said holder is in said cassette receiving position so as to increase the clearance between said reel locating means and a cassette housing during the insertion and removal of a cassette in said holder, and means responsive to movement of said holder to said operative position thereof makes the first mentioned spring means operative to overcome said second spring means.

27. A tape recording and/or reproducing apparatus as in claim 26; in which said means making said first spring means operative to overcome said second spring means includes a lever arm assembly pivoted on said holder and engageable at one end with said reel locating means in said direction toward the base plate, and abutment means on said chassis engageable by the other end of said lever arm assembly for pivoting the latter in the direction to move said reel locating means in said direction toward the base plate, and in which said lever arm assembly includes first and second lever arms connected by said first spring means so that the force for moving said reel locating means toward said base plate is transmitted by way of said first spring means.

* * * * *